(12) United States Patent
Nakajima

(10) Patent No.: US 11,822,834 B2
(45) Date of Patent: Nov. 21, 2023

(54) IMAGE FORMING APPARATUS, CONTROL METHOD, AND STORAGE MEDIUM FOR PREVENTING EXECUTION OF STORED JOB

(71) Applicant: CANON KABUSHIKI KAISHA, Tokyo (JP)

(72) Inventor: Satoru Nakajima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/672,512

(22) Filed: Feb. 15, 2022

(65) Prior Publication Data
US 2022/0269454 A1 Aug. 25, 2022

(30) Foreign Application Priority Data
Feb. 22, 2021 (JP) ................. 2021-026674

(51) Int. Cl.
*G06F 3/12* (2006.01)
(52) U.S. Cl.
CPC ............ *G06F 3/1222* (2013.01); *G06F 3/126* (2013.01); *G06F 3/1238* (2013.01); *G06F 3/1267* (2013.01)
(58) Field of Classification Search
None
See application file for complete search history.

(56) References Cited

U.S. PATENT DOCUMENTS

2019/0361635 A1* 11/2019 Kawanishi ............ G06F 3/1257
2022/0100435 A1 3/2022 Tanimoto et al.

FOREIGN PATENT DOCUMENTS

JP 2015177214 A 10/2015

* cited by examiner

*Primary Examiner* — Thomas D Lee
(74) *Attorney, Agent, or Firm* — Canon U.S.A., Inc. IP Division

(57) ABSTRACT

An image forming apparatus configured to include an execution function of performing authentication processing on a user and executing a stored job, which is stored in a storage device in association with the user, based on a success of the authentication processing without an instruction from the user includes one or more memories, and one or more processors that execute a set of instructions to receive a job execution request to execute a job different from the stored job from an information processing terminal, and in a case where the job execution request is received and the authentication processing using user information included in the job execution request is successful, control execution of the execution function of executing the stored job without the instruction from the user to prevent the execution function from being executed.

9 Claims, 21 Drawing Sheets

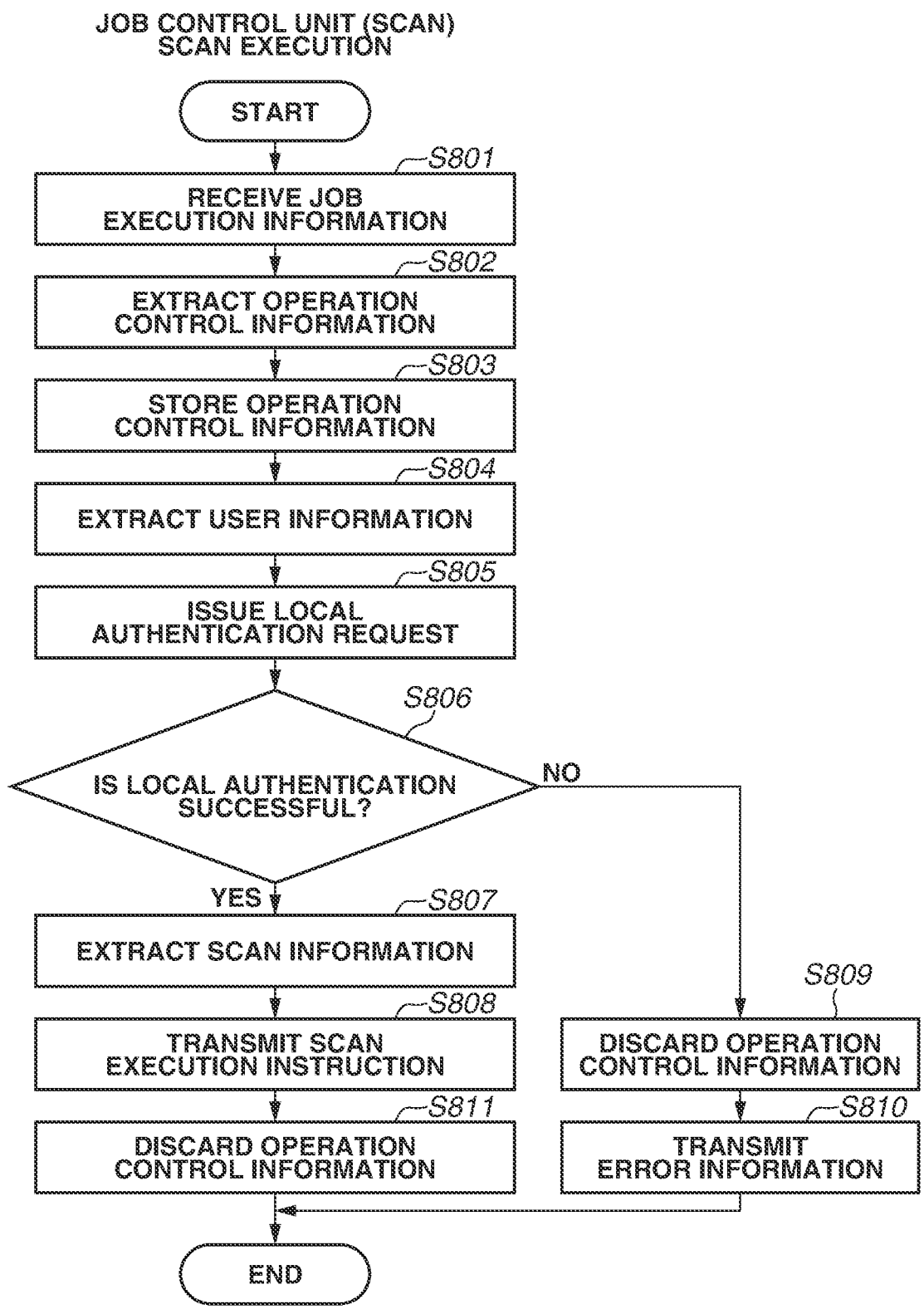

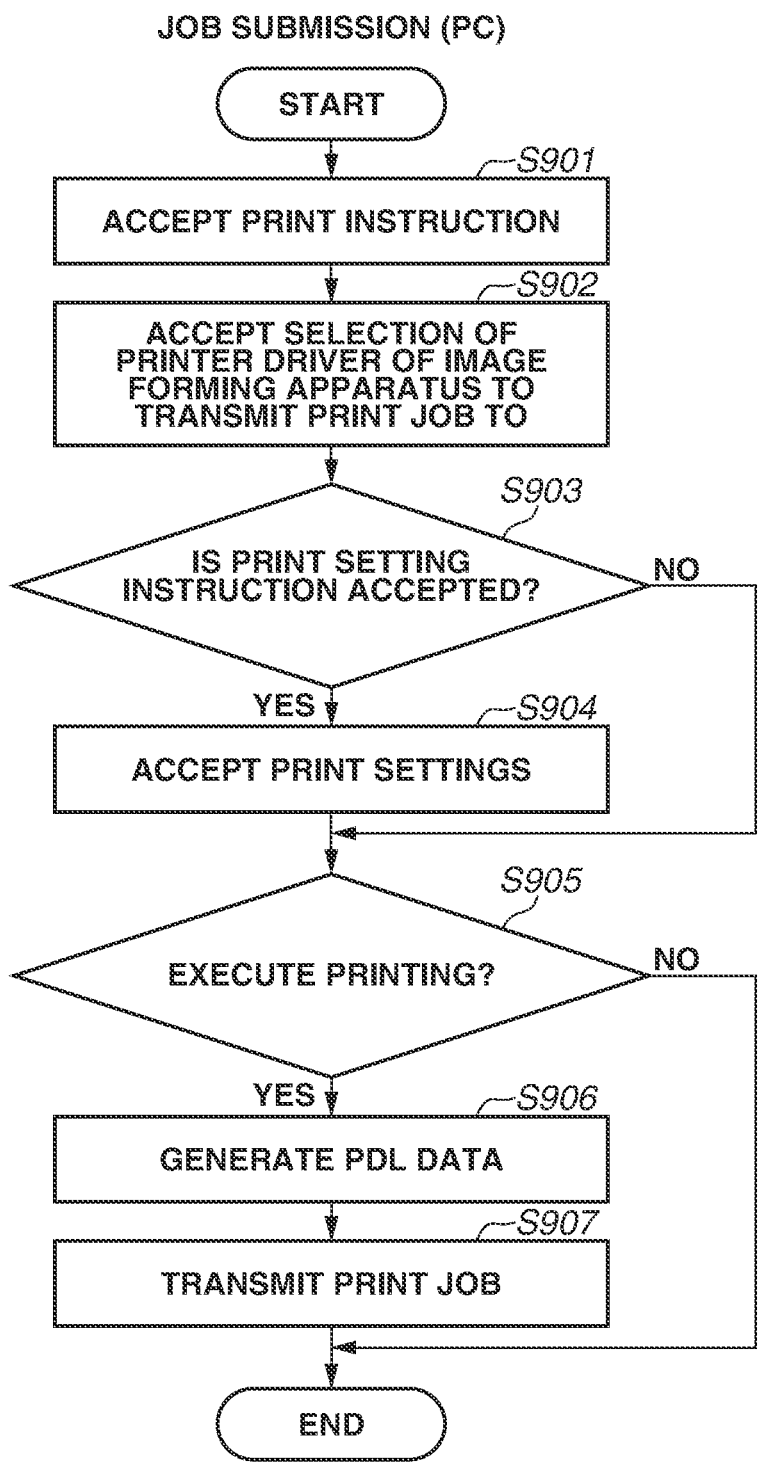

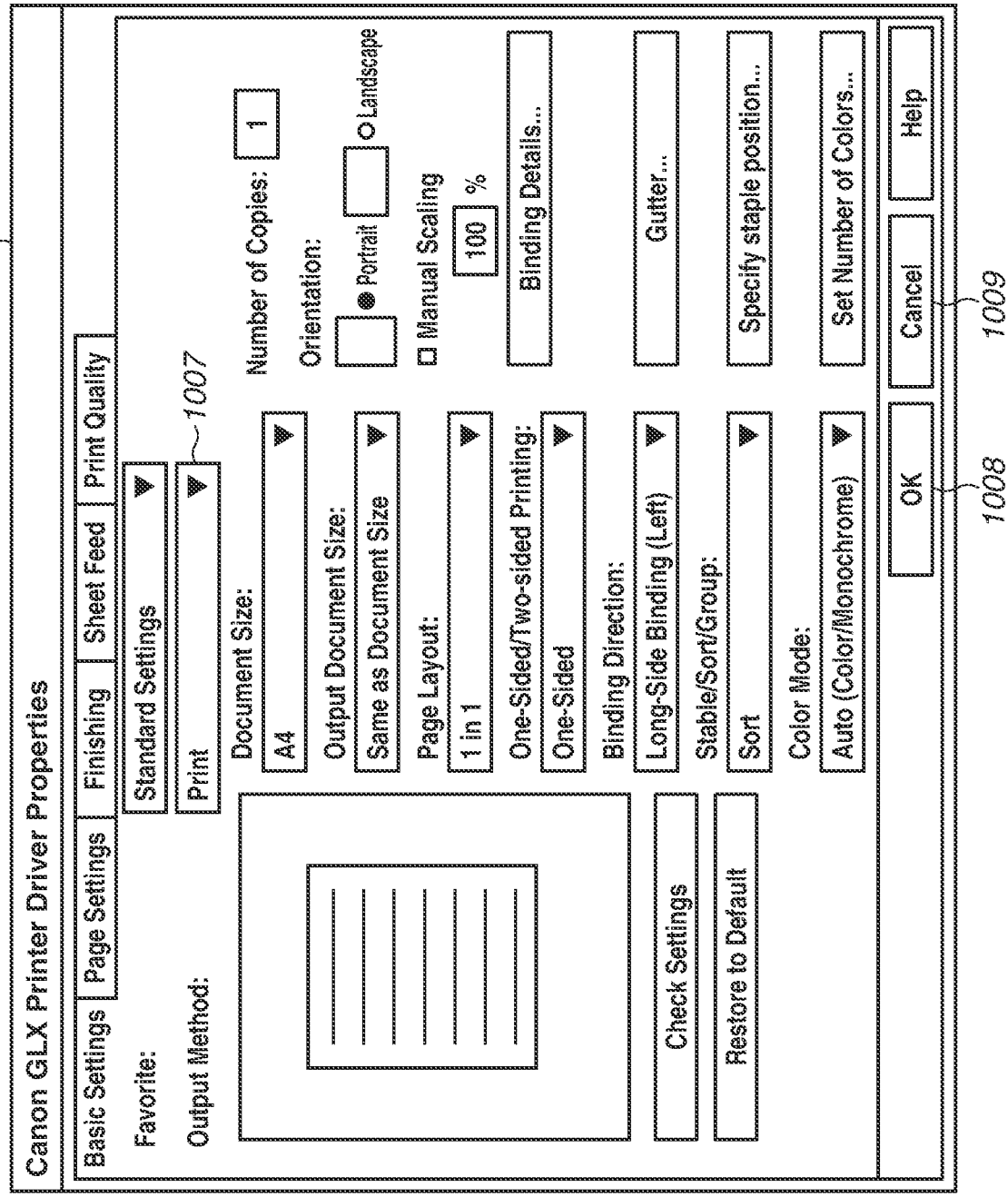

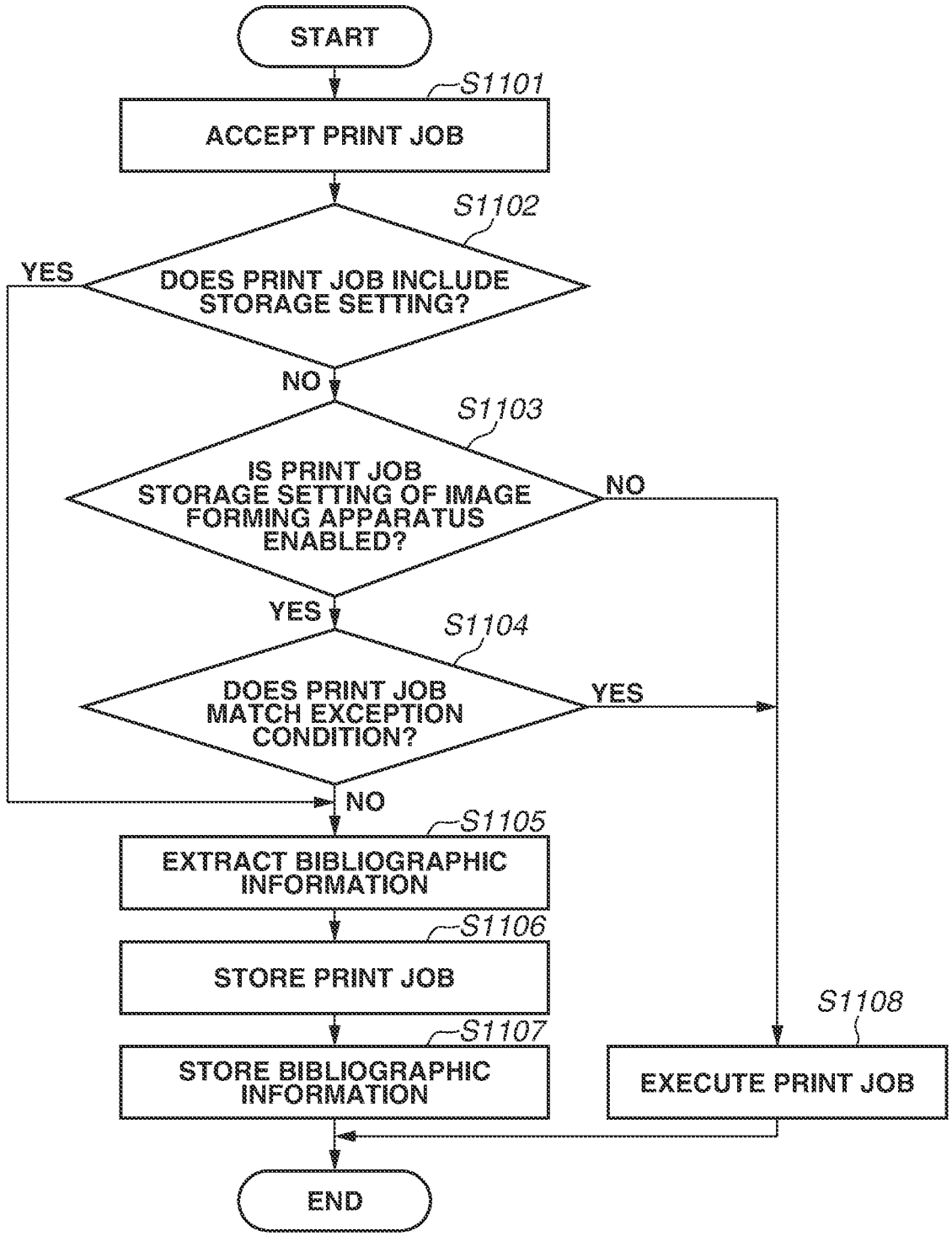

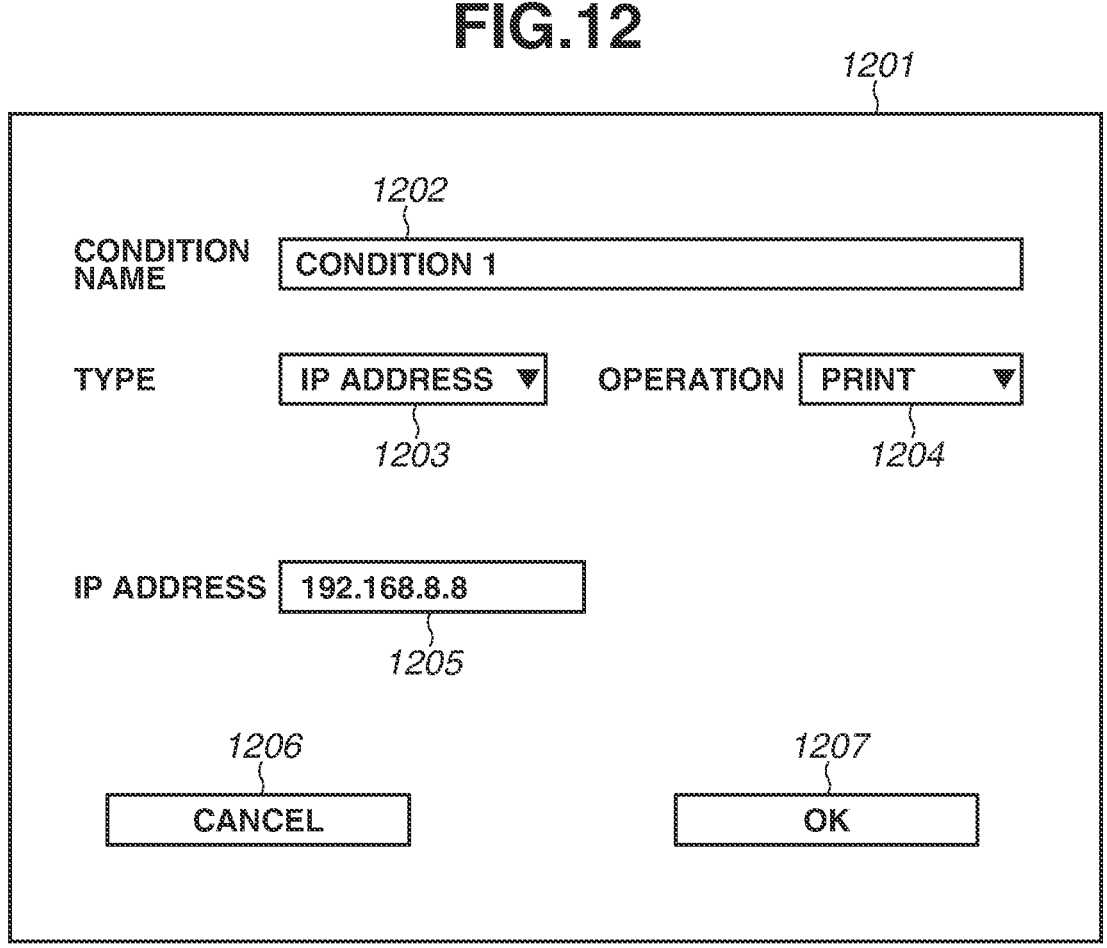

FIG. 13

BIBLIOGRAPHIC INFORMATION TABLE
UserA:

| DATE AND TIME | IP ADDRESS | STORAGE LOCATION | PRINT JOB NAME | PRINT SETTING | NUMBER OF PAGES | PASSWORD | PRINTING STATE |
|---|---|---|---|---|---|---|---|
| 2016/4/10 10:34:45 | 192.168.2.11 | /data/0015/xxx | AAA.txt | ONE-SIDED, 1 COPY, MONOCHROME | 2 | NO | PRINTED |
| 2016/4/20 13:50:22 | 192.168.2.11 | /data/0591/yyy | BBB.pdf | TWO-SIDED, 3 COPIES, COLOR | 40 | YES | PRINT STANDBY |
| 2016/5/28 14:10:00 | 192.168.2.11 | /data/8125/zzz | CCC.doc | TWO-SIDED, 5 COPIES, 2in1, COLOR | 25 | NO | PRINT STANDBY |

FIG.16

USER MANAGEMENT TABLE 1601

| USERNAME | LOGIN PASSWORD | ROLE |
|---|---|---|
| UserA | 1111 | General |
| UserB | 2222 | General |

2001 JOB EXECUTION INFORMATION

| USERNAME | LOGIN PASSWORD | SCAN SETTING | OPERATION CONTROL INFORMATION |
|---|---|---|---|
| UserA | 1111 | AUTO, 300 × 300, A4, PDF | ON |

2002, 2003, 2004, 2005

IMAGE FORMING APPARATUS, CONTROL METHOD, AND STORAGE MEDIUM FOR PREVENTING EXECUTION OF STORED JOB

BACKGROUND OF THE INVENTION

Field of the Invention

The present disclosure relates to an image forming apparatus, a control method, and a storage medium capable of executing a print job stored in association with a user.

Description of the Related Art

With the prevalence of sophisticated mobile terminals such as a smartphone in recent years, a scan function and a print function capable of giving instructions to a printer are being provided as operating system (OS) standard functions of the mobile terminals. For example, in executing a function of transmitting a scanned document to a specified destination, a mobile terminal searches a local area network (LAN) for an image forming apparatus having a transmission function, and generates a transmission job to which a transmission destination mail address and various types of scan setting information (for example, color and two-sided scan settings) set by the user are added. The mobile terminal can instruct the found image forming apparatus to execute a series of processes for transmission by transmitting the generated transmission job to the image forming apparatus. Here, the network communication between the mobile terminal and the image forming apparatus may be established based on communication protocols such as the Transmission Control Protocol/Internet Protocol (TCP/IP), near-field communication (NFC), and Bluetooth®, and can be implemented using known techniques.

An image forming apparatus may have a print function called reservation printing for security purposes. The image forming apparatus does not immediately output a print job submitted from a printer driver but first stores the print job in a hard disk area allocated as a queue for reserving print jobs in the image forming apparatus. After user authentication, the image forming apparatus lists the user's print jobs on an operation unit. The image forming apparatus prints a print job selected from the list and instructed to be printed by the user.

There is a technique called post-authentication automatic printing for automatically printing a print job of an authenticated user based on a success of the user authentication without the user's print instruction. This technique is effective as a means for efficient printing since the printing is performed without the user selecting a print job or giving a print instruction on the operation unit.

Japanese Patent Application Laid-Open No. 2015-177214 discusses a technique for executing a scan job from a mobile terminal, where the execution of a job that includes a scan operation and is registered using the mobile terminal before authentication is restricted until the authentication is completed.

According to Japanese Patent Application Laid-Open No. 2015-177214, to execute a scan job on an image forming apparatus, user authentication with the image forming apparatus is performed using a mobile terminal. Now, suppose that the setting of the foregoing post-authentication automatic printing is enabled in the image forming apparatus. Suppose also that a job such as a print job to be automatically executed based on a success of user authentication is stored, and a job execution request to execute a job different from the job is received. If user authentication with the image forming apparatus using user information included in the job execution request is successful, not only the job related to the job execution request but the stored job is also executed. This can be troublesome to the user because the job stored in advance is also executed based on the user authentication performed to execute the job instructed by the user from the mobile terminal and the user can fail to notice the output product.

SUMMARY OF THE INVENTION

According to an aspect of the present invention, an image forming apparatus configured to include an execution function of performing authentication processing on a user and executing a stored job, which is stored in a storage device in association with the user, based on a success of the authentication processing without an instruction from the user includes one or more memories, and one or more processors that execute a set of instructions to receive a job execution request to execute a job different from the stored job from an information processing terminal, and in a case where the job execution request is received and the authentication processing using user information included in the job execution request is successful, control execution of the execution function of executing the stored job without the instruction from the user to prevent the execution function from being executed.

Further features of the present disclosure will become apparent from the following description of exemplary embodiments with reference to the attached drawings.

BRIEF DESCRIPTION OF THE DRAWINGS

FIG. 8 is a flowchart for describing scan job execution processing by the image forming apparatus.

FIG. 9 is a flowchart for describing print job submission processing by the data processing apparatus.

FIGS. 10A and 10B are diagrams illustrating examples of screens after a print instruction.

FIG. 11 is a flowchart for describing print job storage processing by the image forming apparatus.

FIG. 12 is a diagram illustrating an example of an exception condition setting screen.

FIG. 13 is a diagram illustrating an example of a bibliographic information table.

FIG. 16 is a diagram illustrating an example of a user management table.

FIG. 20 is a diagram illustrating an example of job execution information.

DESCRIPTION OF THE EMBODIMENTS

Exemplary embodiments for carrying out the present disclosure will be described below with reference to the drawings. Note that the following exemplary embodiments are not intended to limit the disclosure set forth in the claims, and all combinations of features described in the exemplary embodiments are not necessarily indispensable to the solving means of the present disclosure.

Figure 1:
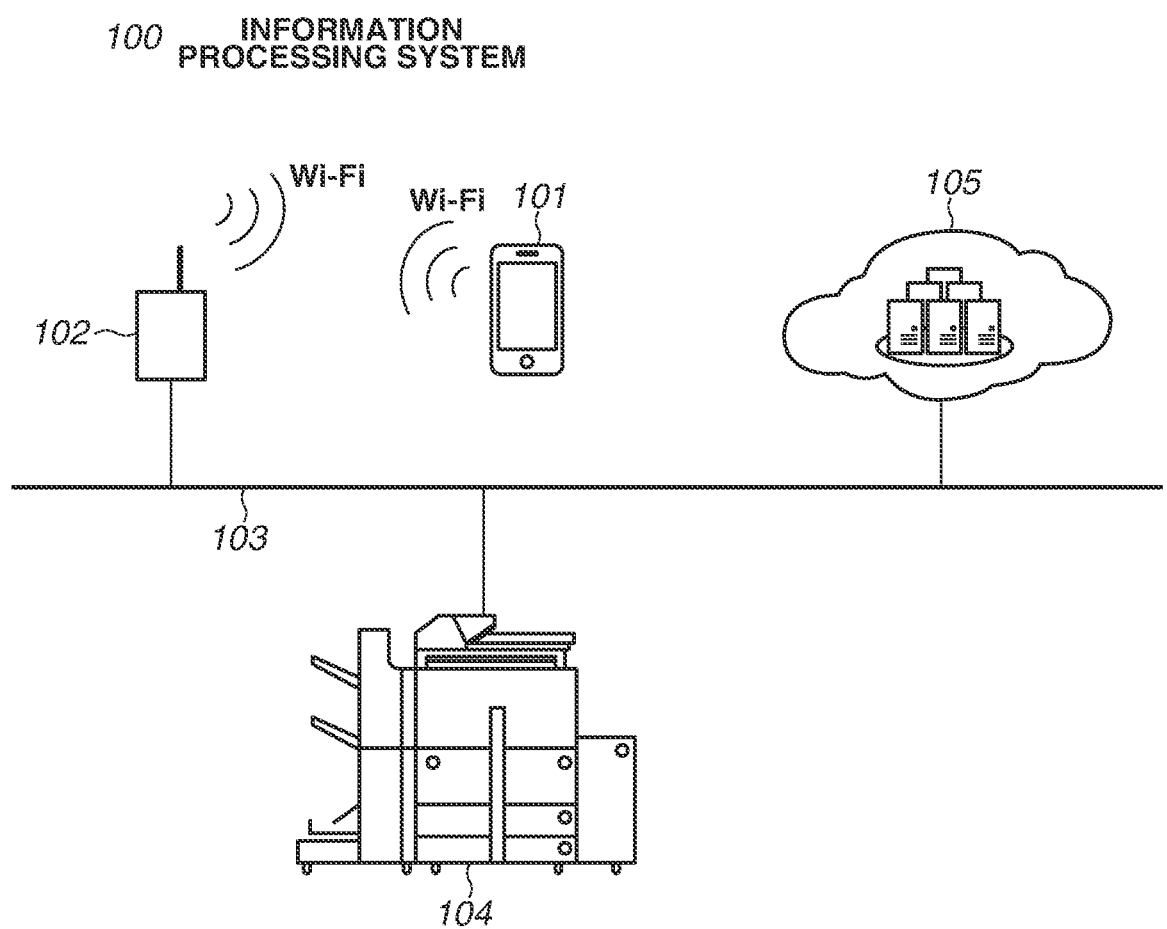
FIG. 1 is a diagram illustrating a configuration of an information processing system.

FIG. 1 is a diagram illustrating a configuration example of an information processing system according to an exemplary embodiment. An information processing system 100 includes a data processing apparatus 101, a wireless local area network (LAN) terminal 102, an image forming apparatus 104, and a cloud server 105, which are connected via a network 103.

The data processing apparatus 101 is an information processing terminal such as a smartphone. A compact terminal operating system and programs for controlling call and data communication may be run on the data processing apparatus 101. Alternatively, the data processing apparatus 101 may be a personal computer (PC) not capable of audio control, position detection control, or mobile phone data communication. The data processing apparatus 101 is connected to the network 103 via the wireless LAN terminal 102.

The wireless LAN terminal 102 is a wireless LAN base station having a typical network router function, and provides a Wi-Fi based wireless LAN at home or in an office. The image forming apparatus 104 is a digital multifunction peripheral having various job execution functions including a print function, a copy function, a scan function, and a facsimile transmission function. A user can instruct the image forming apparatus 104 to execute a job and execute various functions of the image forming apparatus 104 by operating the data processing apparatus 101.

A cloud server 105 manages data to be used by the data processing apparatus 101 and the image forming apparatus 104 and performs extended processing of various functions via the network 103. The information processing system 100 according to the present exemplary embodiment may be configured without the cloud server 105.

In the present exemplary embodiment, the image forming apparatus 104 and the cloud server 105 are connected to the network 103 in a wired manner. However, the image forming apparatus 104 and the cloud server 105 may be wirelessly connected using the wireless LAN terminal 102 like the data processing apparatus 101. The data processing apparatus 101 and the image forming apparatus 104 are also capable of short-range wireless communication via wireless signals of near-field communication (NFC) or Bluetooth® Low Energy. The image forming apparatus 104 has connection information (such as an Internet Protocol (IP) address and a media access control (MAC) address) for establishing a wireless LAN connection with the image forming apparatus 104 in an NFC communication unit or Bluetooth® Low Energy communication unit to be described below. The data processing apparatus 101 obtains the connection information by short-range wireless communication. The data processing apparatus 101 and the image forming apparatus 104 then start communication based on the obtained connection information.

Figure 2:
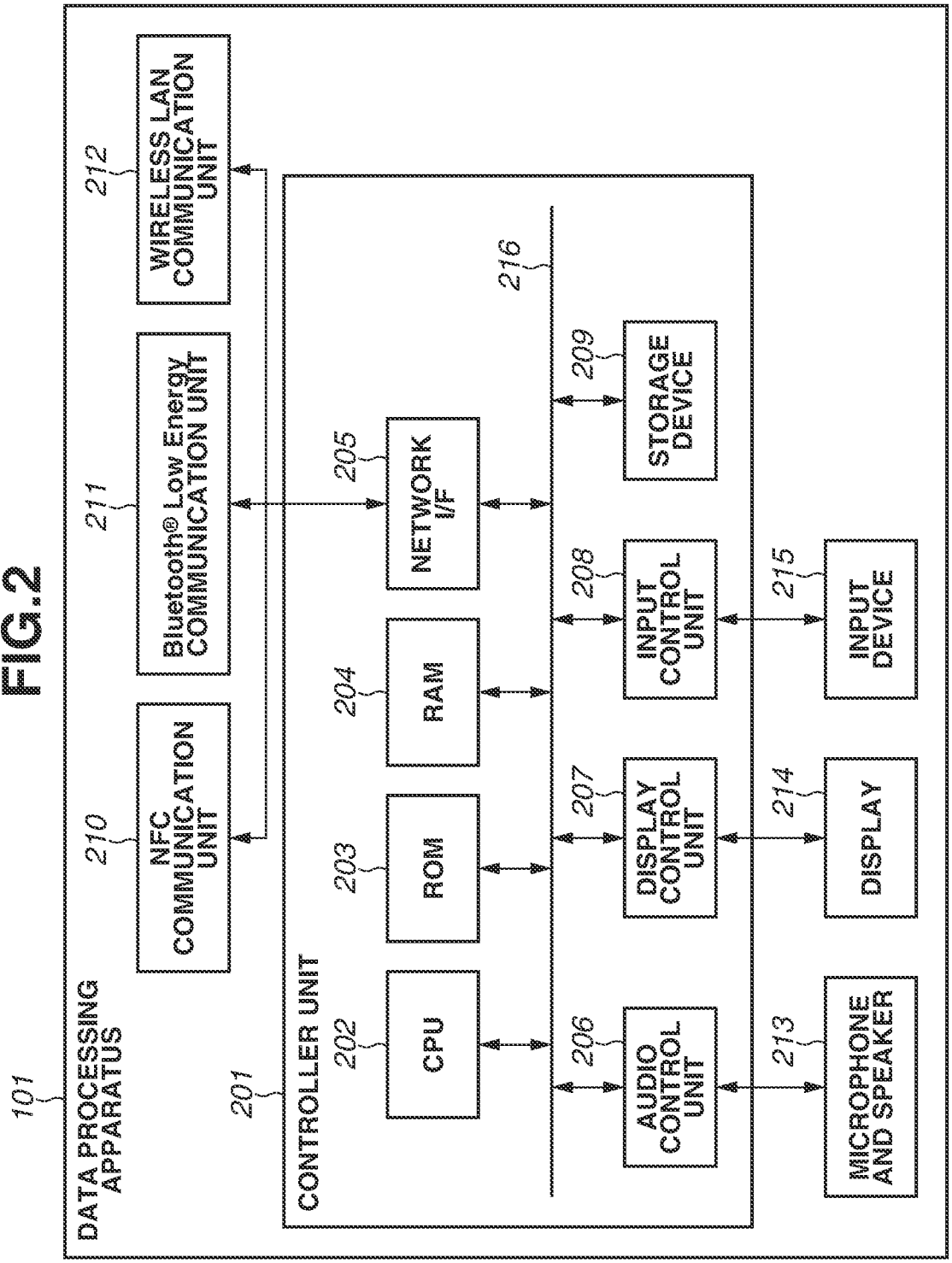
FIG. 2 is a diagram illustrating a hardware configuration of a data processing apparatus.

FIG. 2 is a diagram illustrating an example of a hardware configuration of the data processing apparatus 101 according to the present exemplary embodiment.

The data processing apparatus 101 includes a controller unit 201. The controller unit 201 controls various communication units including an NFC communication unit 210, a Bluetooth® Low Energy communication unit 211, and a wireless LAN communication unit 212, and various user interface (UI) units including a microphone and speaker 213, a display 214, and an input device 215 such as a touch panel, a mouse, and a keyboard.

The controller unit 201 includes a central processing unit (CPU) 202, a read-only memory (ROM) 203, a random access memory (RAM) 204, a network interface (I/F) 205, an audio control unit 206, a display control unit 207, an input control unit 208, and a storage device 209, which are connected by a system bus 216.

The CPU 202 controls the entire system of the data processing apparatus 101. The ROM 203 stores an operating system of the data processing apparatus 101 and applications for controlling call and data communication. The CPU 202 executes various programs. The RAM 204 is a memory for the CPU 202 to execute the various programs, and a work memory area where the applications execute programs. The storage device 209 is a nonvolatile storage device, and records various operation mode settings and operation logs to be retained even after a restart of the data processing apparatus 101.

The network I/F 205 is connected to the NFC communication unit 210, the Bluetooth® Low Energy communication unit 211, and the wireless LAN communication unit 212, and performs various wireless communication controls with the image forming apparatus 104 and the cloud server 105. The audio control unit 206 performs input/output control on audio data via the microphone and speaker 213. The display control unit 207 performs output control on image data to be displayed on the display 214. The input control unit 208 performs input control on information instructed by the user via a button or the input device 215. Various applications that run on the data processing apparatus 101 are provided to the user using the audio control unit 206, the display control unit 207, and the input control unit 208.

Figure 3:
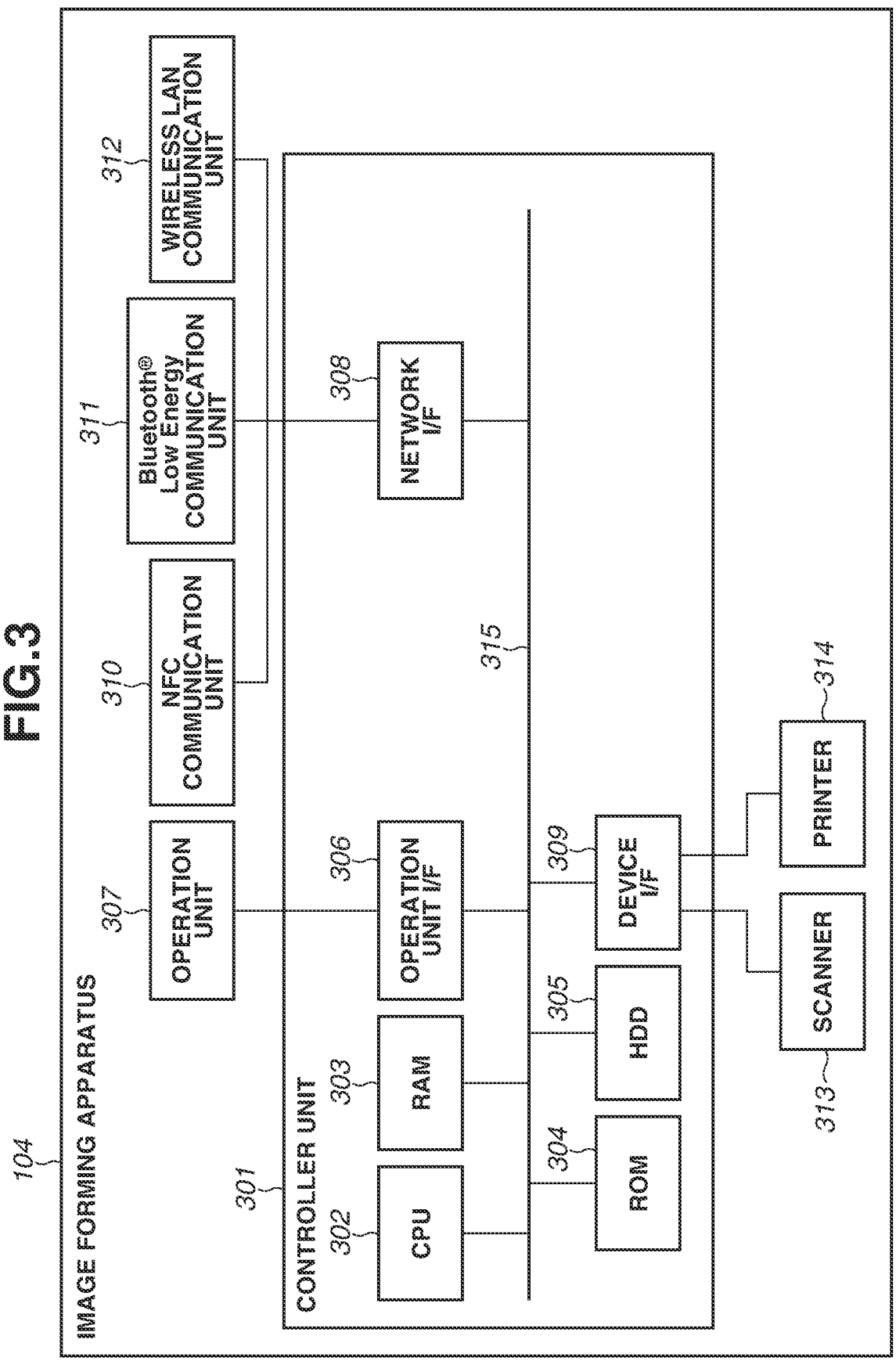
FIG. 3 is a diagram illustrating a hardware configuration of an image forming apparatus.

FIG. 3 is a diagram illustrating an example of a hardware configuration of the image forming apparatus 104 according to the present exemplary embodiment.

The image forming apparatus 104 includes a controller unit 301, and controls various communication units including an NFC communication unit 310, a Bluetooth® Low Energy communication unit 311, and a wireless LAN communication unit 312, as well as an operation unit 307, a scanner 313, and a printer 314.

If the user uses the copy function, the controller unit 301 controls the scanner 313 to obtain image data on a document, and controls the printer 314 to print an image on a sheet and output the sheet. If the user uses the scan function, the controller unit 301 controls the scanner 313 to obtain image data on a document, converts the image data into code data, and transmits the code data to the data processing apparatus 101 or the cloud server 105 via the network 103. If the user uses the print function, the controller unit 301 receives print data (code data) from the data processing apparatus 101 or the cloud server 105 via the network 103. The controller unit 301 then converts the received print data into image data, and transmits the image data to the printer 314. The printer 314 prints an image on a sheet based on the received image data, and outputs the sheet.

The image forming apparatus 104 also has a facsimile (FAX) reception function of receiving data from Integrated Services Digital Network (ISDN) and printing the data, and a FAX transmission function of transmitting scanned data to ISDN. The controller unit 301 stores the received print data in a hard disk drive (HDD) 305, and if the user gives a print instruction for the stored print data from the operation unit 307, prints the print data. The image forming apparatus 104 also has a reservation printing function of performing user authentication and printing only print data stored in association with the authenticated user. An instruction to execute processing in each of such functions will be referred to as a job. The image forming apparatus 104 performs predetermined processing based on jobs corresponding to the respective functions.

The controller unit 301 includes a CPU 302, a RAM 303, a ROM 304, the HDD 305, an operation unit I/F 306, a network I/F 308, and a device I/F 309, which are connected by a system bus 315.

The CPU 302 controls the entire system of the image forming apparatus 104. The RAM 303 is a system work memory for the CPU 302 to operate, and an image memory for temporarily storing image data. The RAM 303 also stores programs such as an operating system, system software, and application software, and data. The ROM 304 stores a system boot program. The HDD 305 is a storage unit (storage device) storing the operating system, system software, application software, image data, and setting data. The HDD 305 also stores scan image data read by the scanner 313 and print image data received from the data processing apparatus 101 via the network 103. Job data such as the print image data received from the data processing apparatus 101 via the network 103 may be stored in an external storage. The image forming apparatus 104 may execute a job based on job data received from the external storage.

The operation unit I/F 306 is an I/F unit with the operation unit 307, and outputs information to be displayed on the operation unit 307 to the operation unit 307. The operation unit I/F 306 also accepts information input by the user from the operation unit 307. The network I/F 308 is connected to the NFC communication unit 310, the Bluetooth® Low Energy communication unit 311, and the wireless LAN communication unit 312, and performs various types of wireless communication control with the data processing apparatus 101 and the cloud server 105. The wireless LAN communication unit 312 forms a wireless LAN with the data processing apparatus 101 via the network 103. The NFC communication unit 310 and the Bluetooth® Low Energy communication unit 311 perform short-range wireless communication with the data processing apparatus 101 via wireless signals. The image forming apparatus 104 transmits and receives job setting information and image data to/from the data processing apparatus 101 via the network I/F 308, and receives execution commands for various functions of the image forming apparatus 104 and executes jobs. The device I/F 309 connects the scanner 313 and the printer 314 for reading and printing image data to the controller unit 301, and inputs and outputs the image data.

Figure 4:
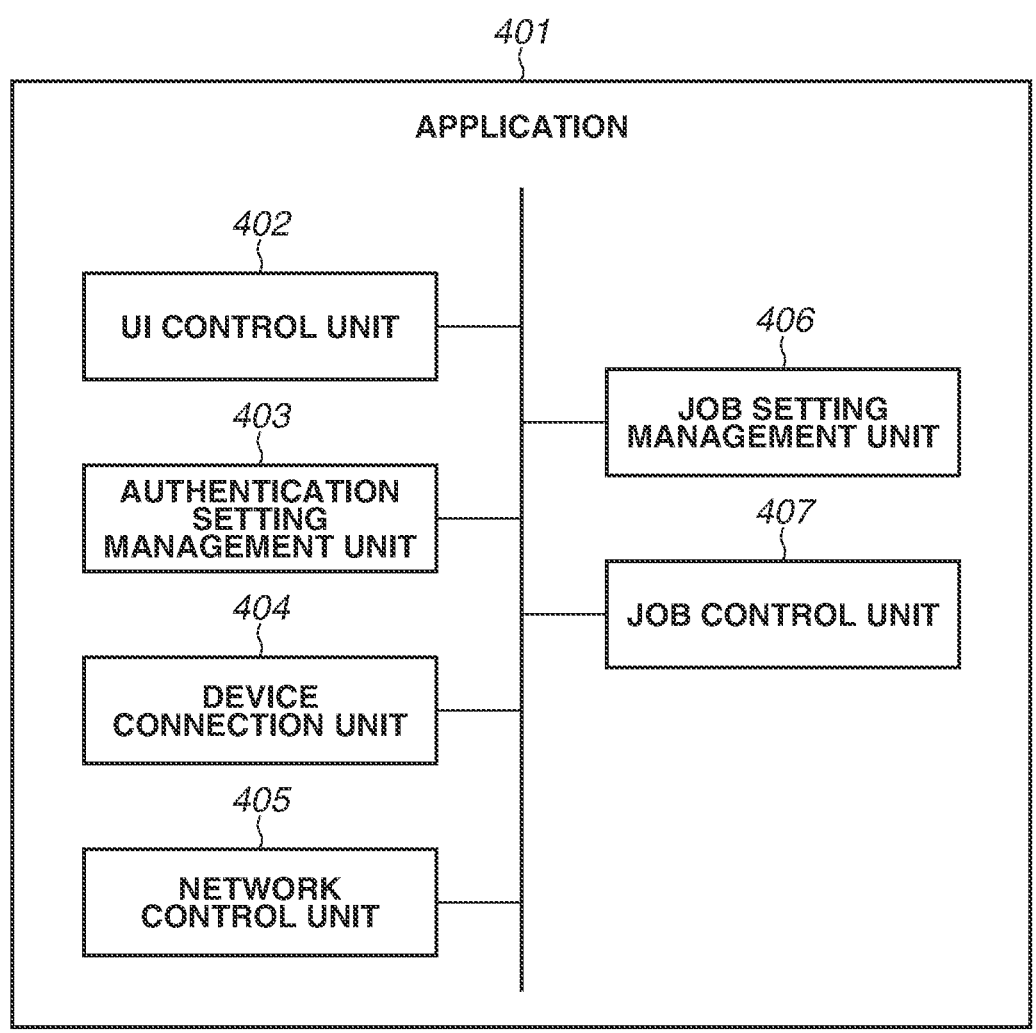
FIG. 4 is a diagram illustrating a software configuration of the data processing apparatus.

FIG. 4 is a diagram illustrating an example of a software configuration of the data processing apparatus 101 according to the present exemplary embodiment.

An application 401 is software to be executed by the CPU 202 of the data processing apparatus 101, and stored in the ROM 203.

A UI control unit 402 accepts job setting information input by the user from the input device 215, and transmits the job setting information to a job setting management unit 406 via the input control unit 208. The UI control unit 402 receives responses from the job setting management unit 406 and a job control unit 407, and outputs the responses to the display 214 via the display control unit 207. The UI control unit 402 further accepts user information input by the user from the input device 215, and transmits the user information to an authentication setting management unit 403 via the input control unit 208. The authentication setting management unit 403 transmits authentication information to a network control unit 405 based on the user information received from the UI control unit 402. The authentication information is used in authentication processing by the image forming apparatus 104 to be described below via the network 103.

A device connection unit 404 establishes short-range wireless communication such as NFC communication and Bluetooth® Low Energy communication between the data processing apparatus 101 and the image forming apparatus 104, and wireless LAN communication via the network 103. For example, in the case of NFC communication, the user brings the NFC communication unit 210 of the data processing apparatus 101 toward and into contact with the NFC communication unit 310 of the image forming apparatus 104, whereby short-range wireless communication is started. In the case of Bluetooth® Low Energy communication, the user brings the Bluetooth® Low Energy communication unit 211 of the data processing apparatus 101 close to the Bluetooth® Low Energy communication unit 311 of the image forming apparatus 104. If the device connection unit 404 determines that the Bluetooth® Low Energy communication units 211 and 311 are located within a distance where Bluetooth® Low Energy intensity is at a certain level or higher, short-range wireless communication is started. The device connection unit 404 thus obtains device information about the image forming apparatus 104 by the user bringing the NFC or Bluetooth® Low Energy communication units of the data processing apparatus 101 and the image forming apparatus 104 close to each other (referred to as a touch operation). The device connection unit 404 starts a wireless LAN connection with the image forming apparatus 104 via the network 103 based on the obtained device information.

The network control unit 405 transmits job settings, job execution instruction commands, image data, and user authentication information to the image forming apparatus 104 via the network 103. The network control unit 405 also receives job setting information stored in the image forming apparatus 104 via the network 103. The job setting management unit 406 stores job setting information input by the user from the UI control unit 402 and job setting information received by the network control unit 405 from the image forming apparatus 104 or the cloud server 105 into the RAM 204 or the storage device 209. Here, the job setting management unit 406 manages such pieces of job setting information as settings frequently used by the user, or "favorite". The job setting management unit 406 also manages job settings stored in the RAM 204 or the storage device 209 upon installation of the application 401 as "preset".

The job control unit 407 generates job execution instruction information from the "favorite" and "preset" job settings registered by the job setting management unit 406, and transmits a job execution request for the image forming apparatus 104 via the network 103. The job control unit 407 also obtains a job execution status and device operation states of the scanner 313 and the printer 314 from the image forming apparatus 104 via the network 103, and transmits the job execution status and the device operation states to the UI control unit 402.

Figure 5:
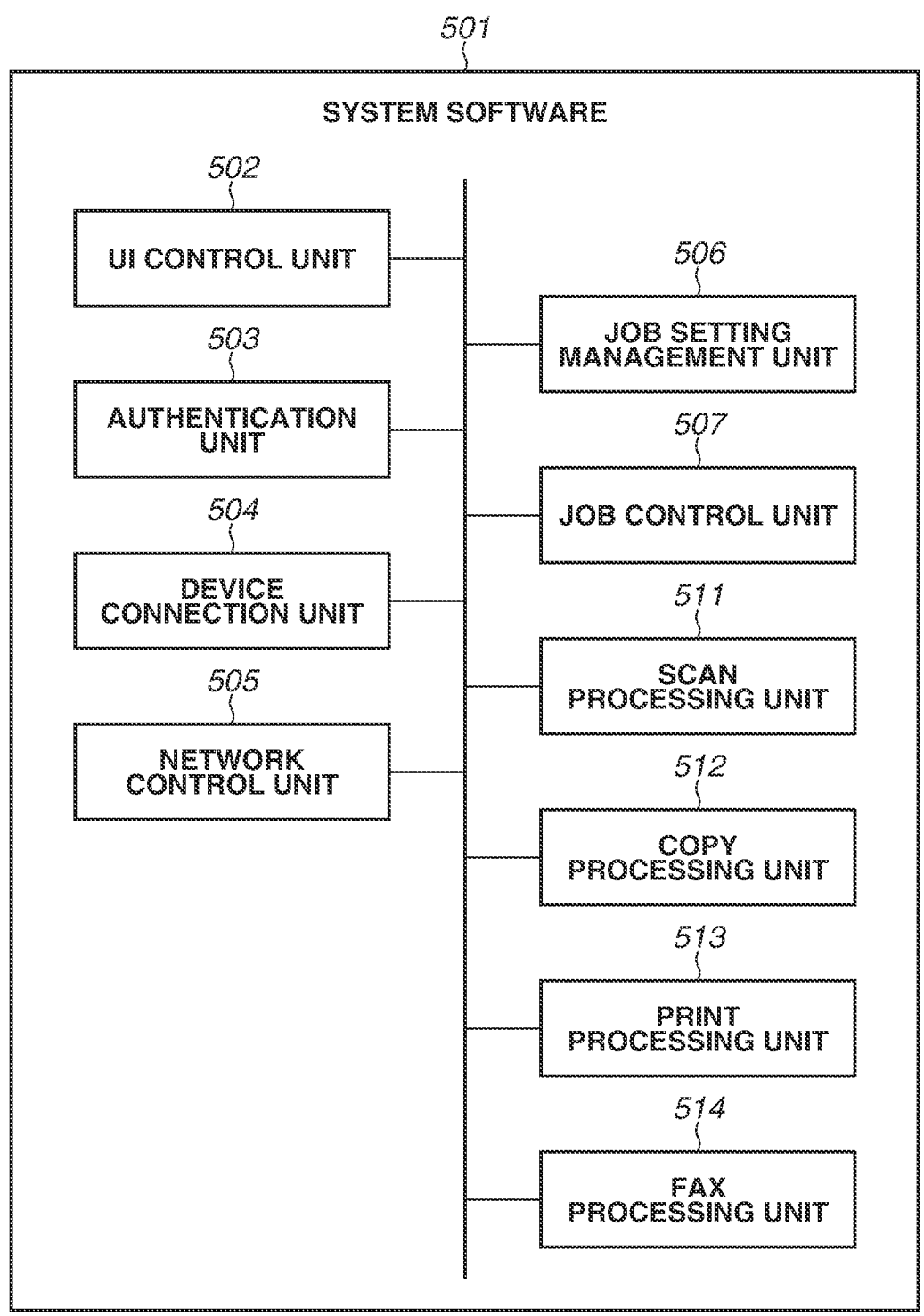
FIG. 5 is a diagram illustrating a software configuration of the image forming apparatus.

FIG. 5 is a diagram illustrating a software configuration of the image forming apparatus 104 according to the present exemplary embodiment.

System software 501 is software to be executed by the CPU 302 of the image forming apparatus 104, and stored in the RAM 303.

A UI control unit 502 accepts job setting information input by the user from the operation unit 307, and transmits the job setting information to a job setting management unit 506. The UI control unit 502 also receives responses from the job setting management unit 506 and a job control unit 507, and outputs the responses to the operation unit 307.

An authentication unit 503 performs user authentication processing based on authentication information received from the data processing apparatus 101, and returns the result.

A device connection unit 504 performs handover using the short-range wireless communication between the data processing apparatus 101 and the image forming apparatus 104 and establishes the wireless LAN communication via the network 103.

A network control unit 505 receives job settings, job execution instruction commands, image data, and user authentication information from the data processing apparatus 101 via the network 103. The network control unit 505 also transmits job setting information stored in the image forming apparatus 104 to the data processing apparatus 101 via the network 103. The job setting management unit 506 stores job setting information input by the user from the UI control unit 502 and job setting information received by the network control unit 505 from the data processing apparatus 101 or the cloud server 105 into the ROM 203 or the HDD 305. Here, the job setting management unit 506 manages such pieces of job setting information as settings frequently used by the user, or "favorite". The job setting management unit 506 also manages custom job settings stored in the RAM 204 or the storage device 209 upon installation of the system software 501 as "preset". The job setting management unit 506 also manages job settings executed by the image forming apparatus 104 as "history".

The job control unit 507 controls processing units such as a scan processing unit 511, a copy processing unit 512, a print processing unit 513, and a FAX processing unit 514 to execute various jobs based on the received job settings. Here, the job control unit 507 executes various jobs based on the job settings made by the user from the operation unit 307 and the "favorite" and "preset" job settings registered by the job setting management unit 506. The job control unit 507 further receives a job execution request received from the data processing apparatus 101 via the network 103, and executes various jobs based on the received job settings and job execution instruction. The job control unit 507 transmits the job execution status and the device operation states of the scanner 313 and the printer 314 to the data processing apparatus 101 via the network 103.

Figure 6:
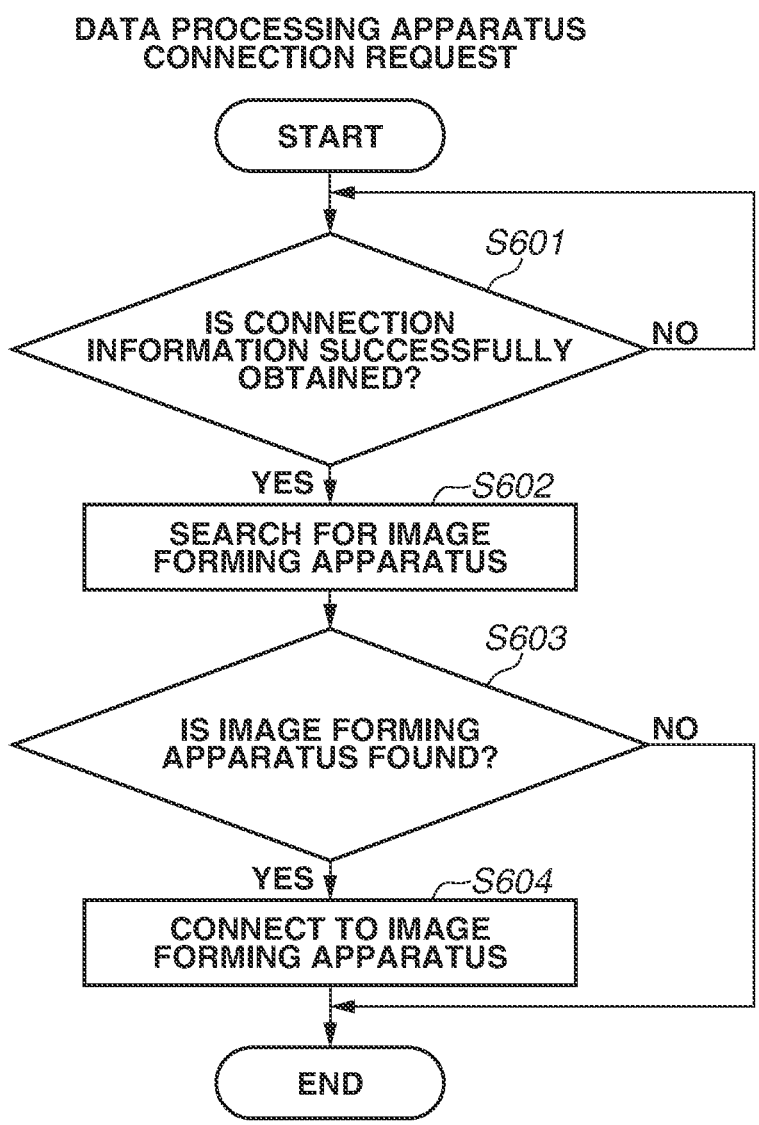
FIG. 6 is a flowchart for describing processing where the data processing apparatus connects to the image forming apparatus.

FIG. 6 is a flowchart illustrating an example of connection processing that the data processing apparatus 101 performs to connect to the image forming apparatus 104. The operations illustrated in FIG. 6 are implemented by the CPU 202 reading programs for implementing the respective units (hereinafter, may be referred to as control modules) stored in the ROM 203 or the storage device 209 into the RAM 204 and executing the programs. The connection processing enables the data processing apparatus 101 to execute a job on the connected image forming apparatus 104.

Figure 18:
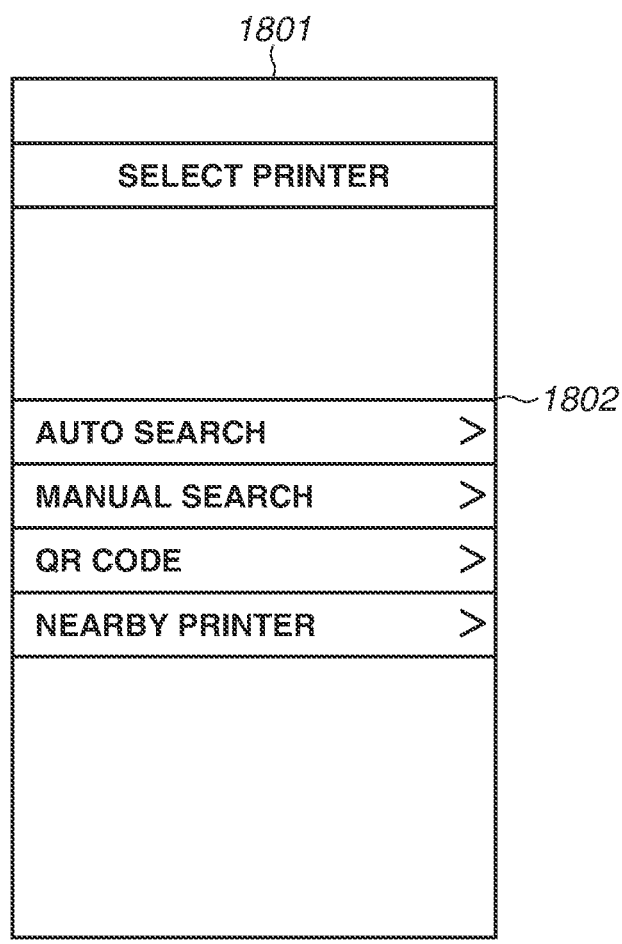
FIG. 18 illustrates an example of a connection screen for connecting to the image forming apparatus, displayed on a display of the data processing apparatus.

The user makes operations to obtain connection information from the image forming apparatus 104 by using the data processing apparatus 101. FIG. 18 illustrates an example of a connection screen for connecting to the image forming apparatus 104, displayed on the display 214 of the data processing apparatus 101. A connection screen 1801 includes device connection methods 1802 "auto search", "manual search", "Quick Response (QR) Code®", and "nearby printer".

"Auto search" represents a method where the device connection unit 404 uses Wi-Fi to search for image forming apparatuses 104 that can communicate with the data processing apparatus 101 on the network 103 via the wireless LAN terminal 102, and connect to a searched image forming apparatus 104. The multicast Domain Name System (mDNS) is used to search for the image forming apparatuses 104. The user selects an image forming apparatus 104 detected by the search, and thereby connects to the image forming apparatus 104 via the device connection unit 404. "Manual search" represents a method for connecting to an image forming apparatus 104 via the device connection unit 404 by the user inputting identification information (such as an IP address) about the image forming apparatus 104 to connect from the input device 215. "QR code" represents a method for connecting to an image forming apparatus 104 via the device connection unit 404 by reading a QR code containing the identification information about the image forming apparatus 104 with a camera mounted on the data processing apparatus 101. "Nearby printer" represents a method for connecting to an image forming apparatus 104 via the device connection unit 404 by the user making an operation of bringing the NFC or Bluetooth® Low Energy communication units of the data processing apparatus 101 and the image forming apparatus 104 close to each other.

In step S601, the device connection unit 404 determines whether connection information is successfully obtained. If connection information is not successfully obtained (NO in step S601), the processing returns to step S601 to continue waiting for connection information to be obtained. If connection information is obtained (YES in step S601), the processing proceeds to step S602. In step S602, the device connection unit 404 searches for the image forming apparatus 104 based on the obtained connection information. In step S603, if the image forming apparatus 104 is found (YES in step S603), the processing proceeds to step S604. In step S604, the device connection unit 404 starts to connect to the image forming apparatus 104. The processing ends. If the image forming apparatus 104 is not found (NO in step S603), the processing ends.

Figure 7:
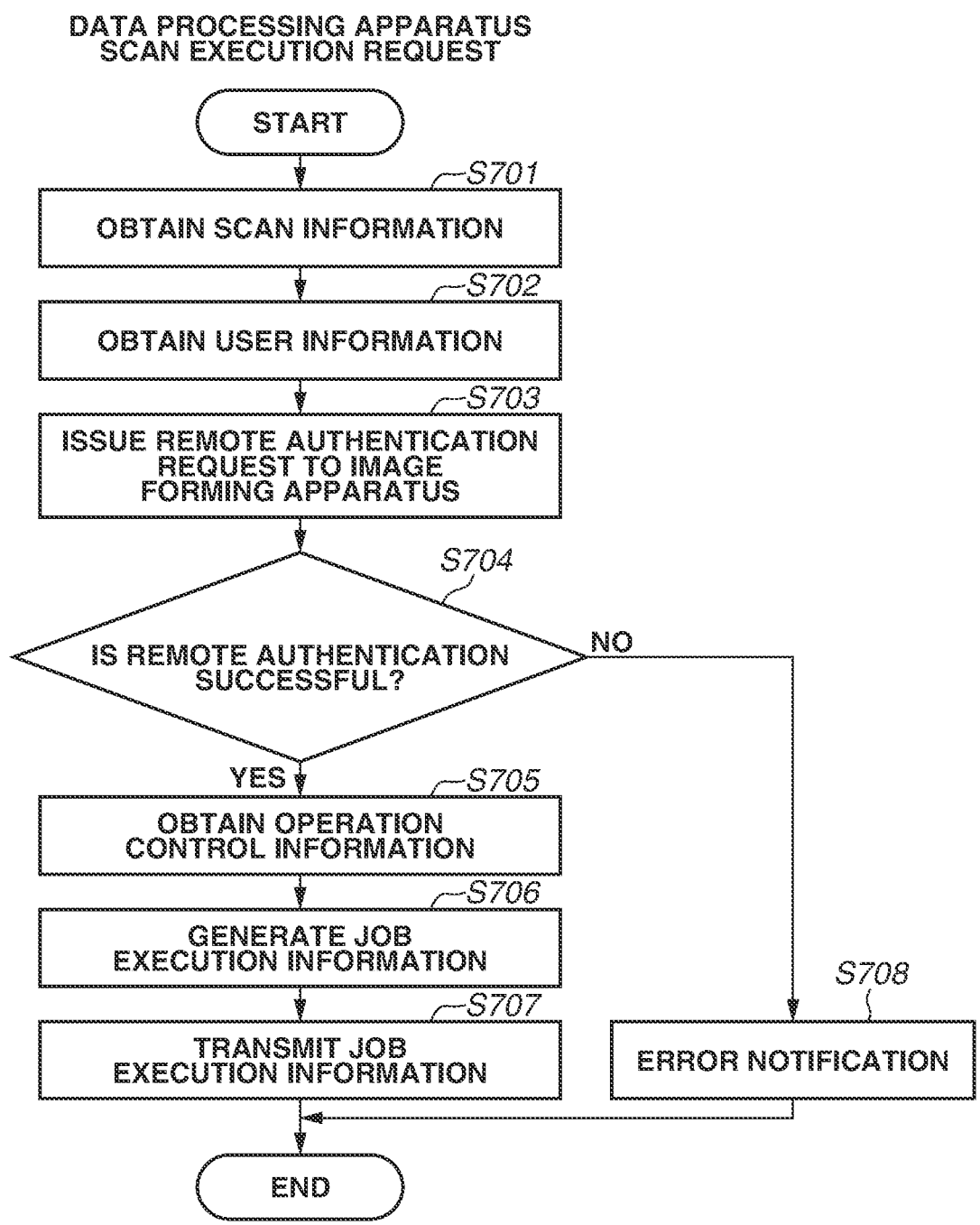
FIG. 7 is a flowchart for describing scan job execution request processing that the data processing apparatus performs on the image forming apparatus.

FIG. 7 is a flowchart illustrating an example of scan job execution request processing that the data processing apparatus 101 performs on the image forming apparatus 104. The operations illustrated in FIG. 7 are implemented by the CPU 202 reading the programs for implementing the control modules stored in the ROM 203 or the storage device 209 into the RAM 204 and executing the programs.

Figure 19:
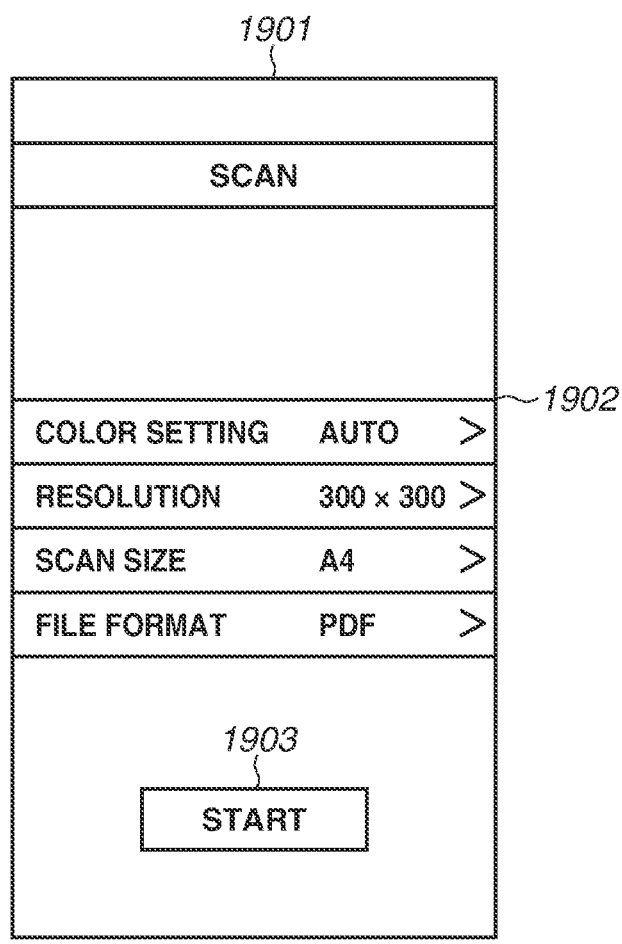
FIG. 19 illustrates an example of a scan execution screen displayed on the display of the data processing apparatus.

The UI control unit 402 obtains scan information stored in the RAM 204 or the storage device 209 of the data processing apparatus 101 via the job setting management unit 406, and displays the scan information on the display 214. FIG. 19 illustrates an example of a scan execution screen displayed on the display 214 of the data processing apparatus 101. An execution screen 1901 displays scan information 1902 "color setting", "resolution", "scan size", and "file format". In the present exemplary embodiment, scan information includes a color setting, resolution, a scan size, and a file format. However, this is not restrictive. A start button 1903 is intended to execute a scan job. The user makes inputs from the input device 215 based on the scan information displayed on the display 214, and presses the start button 1903 to issue a scan job execution request.

In step S701, the job control unit 407 obtains the scan information input by the user. In step S702, the job control unit 407 obtains user information such as a username and a password stored in the RAM 204 or the storage device 209 of the data processing apparatus 101. In step S703, the job control unit 407 issues a remote authentication request to the image forming apparatus 104. Note that in step S702, the job control unit 407 may obtain user information input by the user instead of the user information stored in the RAM 204 or the storage device 209. As employed herein, remote authentication refers to authentication for authorizing a start of communication between the data processing apparatus 101 and the image forming apparatus 104.

In step S704, if the remote authentication is failed (NO in step S704), the processing proceeds to step S708. The job control unit 407 notifies the UI control unit 402 of the failure of the remote authentication. In step S708, the UI control unit 402 displays an error screen on the display 214. The processing ends. On the other hand, if the remote authentication is successful (YES in step S704), the processing proceeds to step S705. In step S705, the job control unit 407 obtains operation control information. The operation control information is information for disabling execution of jobs other than the received job if the image forming apparatus 104 receives a job execution request from the data processing apparatus 101. The operation control information may be information determined in advance. The operation control information may be selected by the user using the input device 215 based on a selection screen displayed on the display 214. In step S706, the job control unit 407 generates job execution information from the obtained scan information, user information, and operation control information. In step S707, the job control unit 407 transmits the job execution information to the connected image forming apparatus 104. The processing ends. FIG. 20 is a diagram illustrating an example of the job execution information. Job execution information 2001 includes a username 2002, a login password 2003, a scan setting 2004, and operation control information 2005. For example, FIG. 20 illustrates that the username 2002 is UserA, the login password 2003 is 1111, the scan setting 2004 is the same as the settings made on the scan execution screen of FIG. 19 (auto, 300×300, A4, and Portable Document Format (PDF)), and operation control information 2005 is ON. Whether to restrict the execution of jobs other than the one related to the job execution request may be indicated by whether the operation control information 2005 is enabled (ON) or disabled (OFF), or by the presence or absence of the operation control information 2005.

In the present exemplary embodiment, the data processing apparatus 101 and the image forming apparatus 104 are connected before the issuance of the scan job execution request by the user. However, the data processing apparatus 101 and the image forming apparatus 104 may be connected after the issuance of the scan job execution request by the user and before the issuance of the remote authentication request.

FIG. 8 is a flowchart illustrating an example of scan job execution processing performed by the image forming apparatus 104. The operations illustrated in FIG. 8 are implemented by the CPU 302 reading programs for implementing the control modules stored in the ROM 304 or the HDD 305 into the RAM 303 and executing the programs.

In step S801, the job control unit 507 receives job execution information from the data processing apparatus 101 via the network control unit 505. In step S802, the job control unit 507 extracts operation control information from the received job execution information. In step S803, the job control unit 507 stores the operation control information in the RAM 303. In step S804, the job control unit 507 extracts user information from the received job execution information. In step S805, the job control unit 507 issues a local authentication request for the extracted user information to the authentication unit 503. Local authentication is authentication for authorizing the user to operate the operation unit 307 of the image forming apparatus 104. In the present exemplary embodiment, the local authentication is performed if the image forming apparatus 104 accepts the job execution information from the data processing apparatus 101. In step S806, the job control unit 507 determines whether the local authentication is successful. If the local authentication is successful (YES in step S806), the processing proceeds to step S807. In step S807, the job control unit 507 extracts scan information from the job execution information. In step S808, the job control unit 507 transmits to the device connection unit 504 a scan execution instruction along with the extracted scan information. Scan processing is thus executed. In step S811, the job control unit 507 discards the operation control information stored in step S803. The processing ends. On the other hand, if the local authentication is failed (NO in step S806), the processing proceeds to step S809. In step S809, the job control unit 507 discards the operation control information stored in step S803. In step S810, the job control unit 507 transmits error information to the data processing apparatus 101 via the network control unit 505. The processing ends.

FIG. 9 is a flowchart illustrating an example of print job submission processing performed by the data processing apparatus 101. Here, the data processing apparatus 101 will be described as a PC, and the print job submission processing will be described as processing for printing data generated by the application 401 using a printer driver. The operations illustrated in FIG. 9 are implemented by the CPU 202 reading the programs for implementing the control modules stored in the ROM 203 or the storage device 209 into the RAM 204 and executing the programs.

Figure 10A:
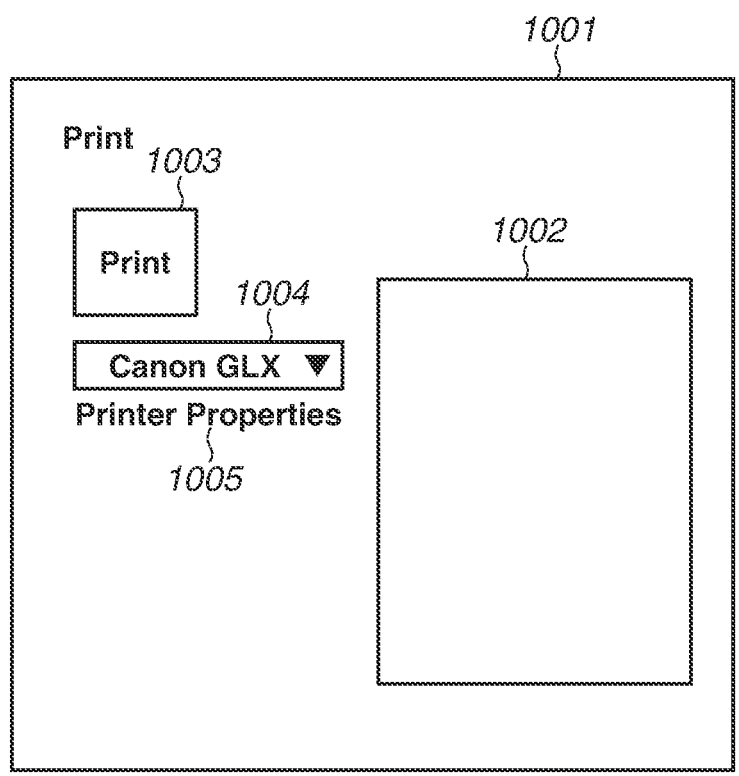

The user generates image or document data by using the application 401 and gives a print instruction using the input device 215 such as a pointing device and a keyboard while viewing the display 214. In step S901, the application 401 accepts the print instruction. The application 401 displays a screen where the user selects a printer driver of an image forming apparatus to transmit a print job to on the display 214. In step S902, the application 401 accepts the selection of the printer driver of the image forming apparatus 104 as that of the image forming apparatus to transmit the print job to from the user. In step S903, the application 401 determines whether a print setting instruction is accepted from the user. If no print setting instruction is accepted (NO in step S903), the processing proceeds to step S905. If a print setting instruction is accepted (YES in step S903), the processing proceeds to step S904. In step S904, the application 401 displays a setting screen of the printer driver corresponding to the image forming apparatus 104. FIGS. 10A and 10B are diagrams illustrating examples of screens after the print instruction. FIG. 10A illustrates an example of a screen where the user selects the printer driver of the image forming apparatus to transmit a print job to. A screen 1001 includes a display area 1002 for displaying an image of the data to be printed, and a button 1003 for executing printing. A list 1004 is intended to select the image forming apparatus to transmit the print job to and the printer driver thereof. The list 1004 displays the printer drivers of a plurality of image forming apparatuses installed on the data processing apparatus 101 by the user. The user selects a desired printer driver from the list 1004. A character string 1005 is a pressable character string intended to display the setting screen of the printer driver selected from the list 1004. FIG. 10B is a diagram illustrating an example of the setting screen of the printer driver. The user makes print settings on the setting screen. A screen 1006 includes a list 1007 of job output methods, from which "print" and "secure print" can be selected. If "print" is selected, a print job transmitted to the image forming apparatus 104 is output based on the print settings. "Secure print" represents a print job specified to be temporarily stored in the image forming apparatus 104, and a password specified by the user is given to the print job. A button 1008 is intended to confirm the settings and close the screen 1006. A button 1009 is intended to discard the settings and close the screen 1006. To print a secure print job stored in the image forming apparatus 104, the user selects the secure print job on the operation unit 307 and enters the given password, whereby the secure print job is output. After the acceptance of the user's setting instruction in step S904, then in step S905, the application 401 determines whether to execute printing. If the application 401 determines to execute printing (YES in step S905), the processing proceeds to step S906. In step S906, the application 401 issues a data generation request to the printer driver corresponding to the selected image forming apparatus 104. The printer driver generates page description language (PDL) data based on the image or document data, document attributes such as a document name, the print settings, and the username. In step S907, the printer driver transmits the PDL data to the image forming apparatus 104 as a print job.

FIG. 11 is a flowchart illustrating an example of print job storage processing performed by the image forming apparatus 104. The operations illustrated in FIG. 11 are implemented by the CPU 302 reading the programs for implementing the control modules stored in the ROM 304 or the HDD 305 into the RAM 303 and executing the programs.

The data processing apparatus 101 transmits a print job execution request to the image forming apparatus 104. In step S1101, the network control unit 505 accepts a print job. The network control unit 505 transmits the print job to the job control unit 507. In step S1102, the job control unit 507 receives the print job, and determines whether the print job includes a storage setting. A print job including a storage setting refers to one for which "secure print" is specified as the output method on the setting screen of the printer driver. If the print job includes the storage setting (YES in step S1102), the processing proceeds to step S1105. If the print job does not include the storage setting (NO in step S1102), the processing proceeds to step S1103. In step S1103, the job control unit 507 determines whether a print job storage setting of the image forming apparatus 104 is enabled. The print job storage setting is made with respect to each image forming apparatus, and stored in the RAM 303 or the HDD 305. If the print job storage setting of the image forming apparatus 104 is disabled (NO in step S1103), the processing proceeds to step S1108. If the print job storage setting of the image forming apparatus 104 is enabled (YES in step S1103), the processing proceeds to step S1104. In step S1104, the job control unit 507 further determines whether the print job matches an exception condition for printing. An exception condition refers to a condition to perform processing other than storage processing even if the print job storage setting of the image forming apparatus is enabled. A plurality of exception conditions is set for the image forming apparatus 104 in advance by an administrator before printing is performed.

FIG. 12 is a diagram illustrating an example of an exception condition setting screen. In the present exemplary embodiment, using an IP address of a specific PC as a condition, an exception condition to not store and print a print job from the PC having the specified IP address will be described to be set. An exception condition setting screen 1201 includes an area 1202 for inputting a condition name, where a condition name "CONDITION 1" is specified. An area 1203 is intended to select a type, where an exception condition, like a specific submission job owner name, a specific submission source IP address, or a specific job submission method (such as Line Printer Remote (LPR) and the File Transfer Protocol (FTP)), is selected. In FIG. 12, "IP address" is selected. An area 1204 is intended to select processing for a job matching the condition selected in the area 1203. Examples of the processing include printing and cancellation. In FIG. 12, "print" is selected. An area 1205 is intended to input a specific condition based on the type of condition. In FIG. 12, since the type is an IP address, an area for inputting an IP address is displayed as the area 1205. The IP address of a core system "192.168.8.8" is specified in the area 1205. A cancel button 1206 is intended to discard the settings. An OK button 1207 is intended to confirm the settings. If the OK button 1207 is pressed, the settings are stored in the RAM 303 or the HDD 305.

Return to the description of FIG. 11. In step S1104, if the print job matches the exception condition (YES in step S1104), the processing proceeds to step S1108. On the other hand, if the print job does not match the exception condition (NO in step S1104), the processing proceeds to step S1105. In step S1105, the job control unit 507 analyzes the print job to extract bibliographic information. In step S1106, the job control unit 507 stores the print job in the HDD 305. In step S1107, the job control unit 507 stores the extracted bibliographic information in the HDD 305 in association with the user. FIG. 13 is a diagram illustrating an example of a bibliographic information table. A bibliographic information table 1301 for user UserA includes, as submission information about a print job, a date and time 1302 of submission of the print job, an IP address 1303 of the image forming apparatus to which the print job is submitted, and a storage location 1304 of the submitted print job. The bibliographic information table 1301 also includes, as attribute information about the print job, a print job name 1305, a print setting 1306, the number of pages 1307 of the print job, the presence or absence of a printing password 1308, and a printing state 1309 indicating whether the print job is printed. Return to the description of FIG. 11. If the processing of step S1105, S1106, or S1107 fails due to reasons such as insufficient free space of the HDD 305, the processing ends. If the bibliographic information is successfully stored, the processing ends. If, in step S1103, the print job storage setting of the image forming apparatus is disabled (NO in step S1103), or if, in step S1104, the print job matches the exception condition (YES in step S1104), the processing proceeds to step S1108. In step S1108, the job control unit 507 executes the print job.

In such a manner, the print job storage processing is performed.

Figure 14:
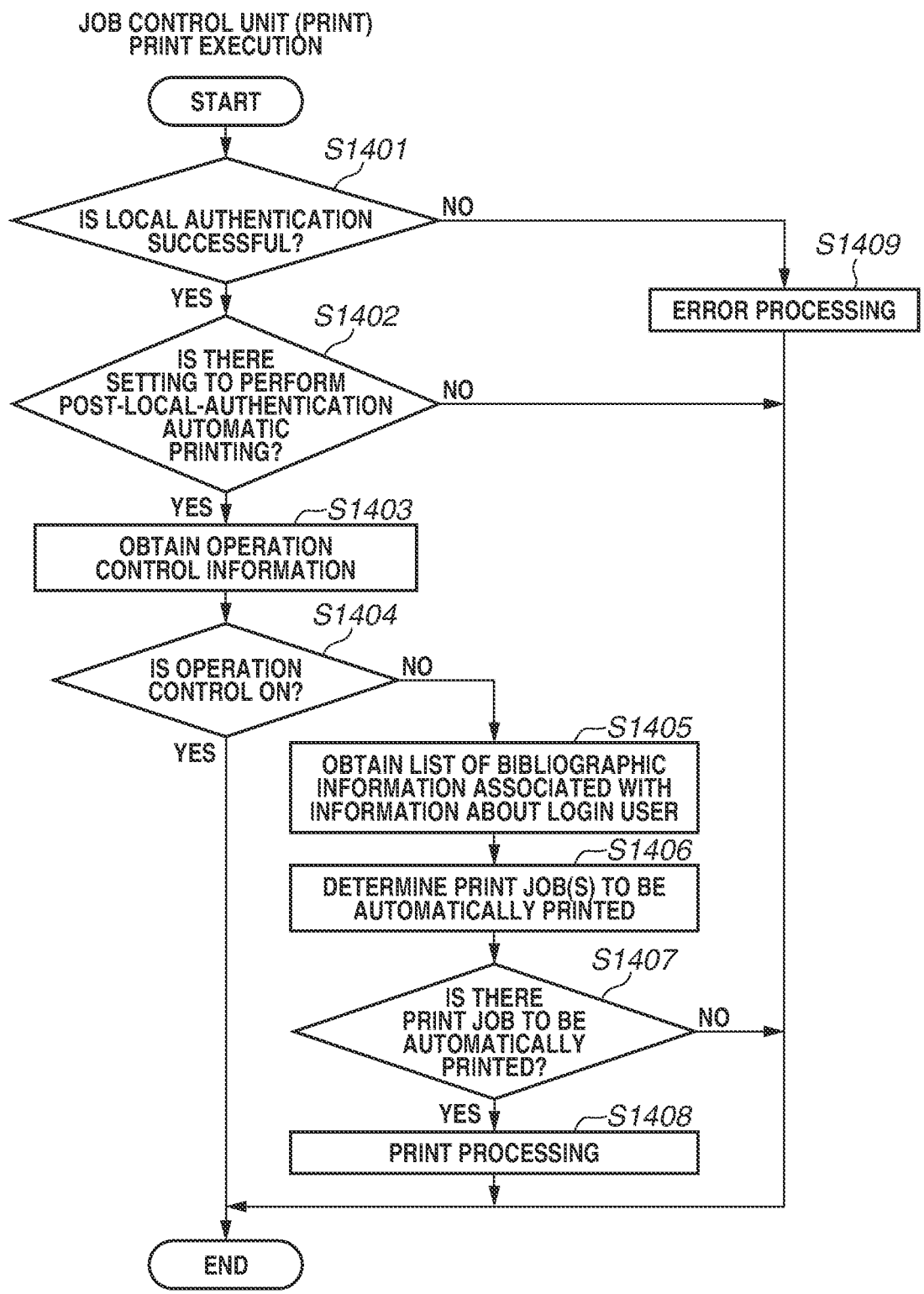
FIG. 14 is a flowchart for describing post-local-authentication automatic print processing by the image forming apparatus.

FIG. 14 is a flowchart for describing post-local-authentication automatic print processing performed by the image forming apparatus 104. The operations illustrated in FIG. 14 are implemented by the CPU 302 reading the programs for implementing the control modules stored in the ROM 304 or the HDD 305 into the RAM 303 and executing the programs.

As employed herein, the post-local-authentication automatic print processing refers to processing for automatically executing a print job stored in the HDD 305 of the image forming apparatus 104 by the storage processing illustrated in FIG. 11 based on execution of local authentication. If the job execution information received by the image forming apparatus 104 from the data processing apparatus 101 includes operation control information, the image forming apparatus 104 controls the local authentication-based automatic print processing not to be executed.

Figure 15:
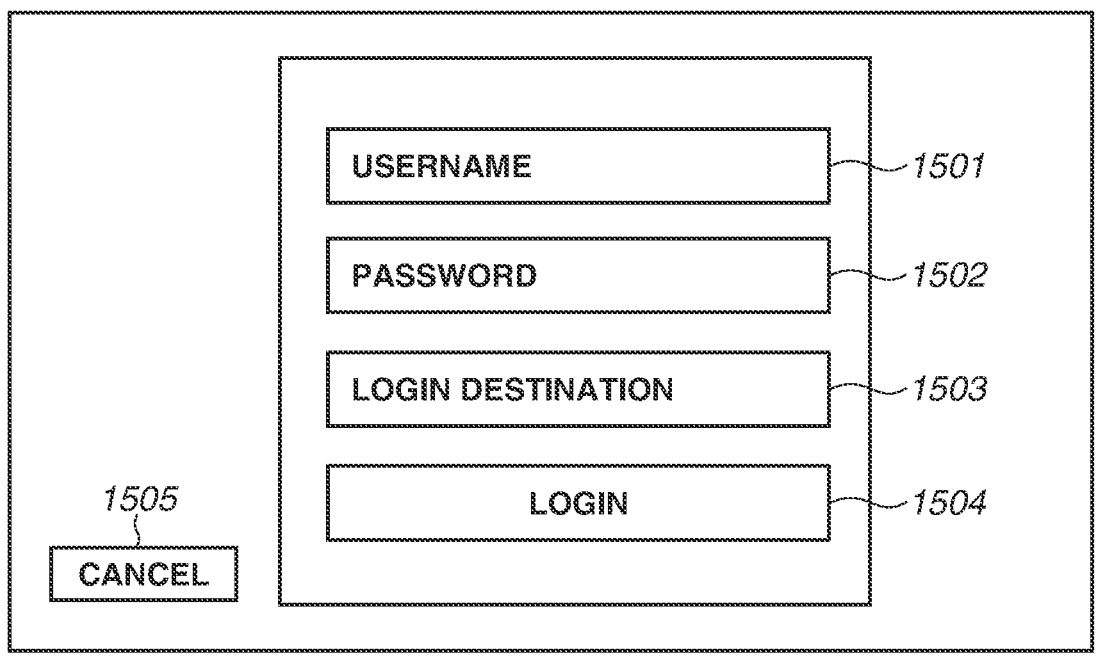
FIG. 15 is a diagram illustrating an example of a login screen.

In step S1401, the authentication unit 503 performs local authentication processing based on the login information input by the user from the operation unit 307 and a user management table stored in the HDD 305. FIG. 15 is a diagram illustrating an example of a login screen. The login screen includes an input area 1501 for a username, an input area 1502 for a login password, an input area 1503 for a login destination, and a button 1504 for performing login using the input username and login password. A cancel button 1505 is intended to close the login screen. FIG. 16 is a diagram illustrating an example of the user management table. A user management table 1601 includes a username 1602, a login password 1603, and a role 1604 indicating the user's authority.

Figure 17:
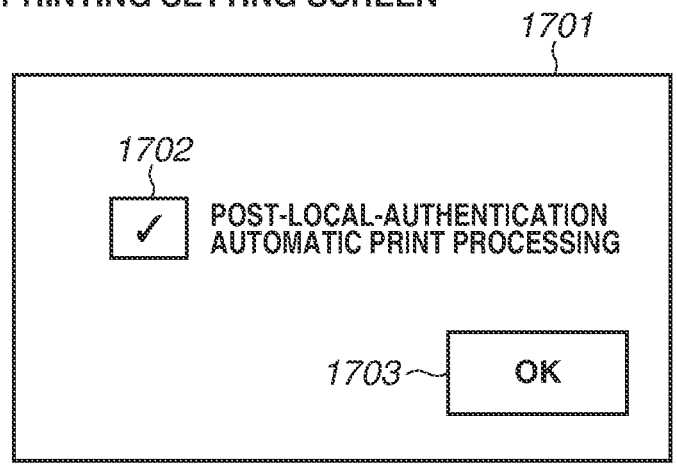
FIG. 17 is a diagram illustrating an example of a setting screen for post-local-authentication automatic printing.

If the local authentication is failed (NO in step S1401), the processing proceeds to step S1409. In step S1409, the authentication unit 503 performs error processing. The processing ends. If the local authentication is successful (YES in step S1401), the processing proceeds to step S1402. In step S1402, the authentication unit 503 notifies the job control unit 507 of the success of the local authentication and information about the authenticated user (login user). Receiving the notification that the local authentication is successful from the authentication unit 503, the job control unit 507 determines whether there is a setting to perform automatic printing after local authentication. Whether to perform automatic printing after local authentication is set by an administrator user from the operation unit 307. FIG. 17 is a diagram illustrating an example of a post-local-authentication automatic printing setting screen. A screen 1701 includes a checkbox 1702 for whether to enable post-local-authentication automatic printing. If the checkbox 1702 is checked, the post-local-authentication automatic printing is enabled. An OK button 1703 is intended to confirm the setting and close the screen 1701. The setting of the post-local-authentication automatic printing is made for each image forming apparatus, and stored in the RAM 303 or the HDD 305. If there is no setting to perform the post-local-authentication automatic printing (NO in step S1402), the processing ends. If there is a setting to perform the post-local-authentication automatic print setting (YES in step S1402), the processing proceeds to step S1403. In step S1403, the job control unit 507 obtains the operation control information stored in the RAM 303 in step S803. In step S1404, the job control unit 507 determines whether operation control is on. If the operation control is on (YES in step S1404), or equivalently, if a scan job execution request is received from the data processing apparatus 101 and jobs other than the received job are controlled not to be executed, the processing ends. In other words, the automatic printing based on the local authentication is not executed. If the operation control is off (NO in step in step S1404), i.e., if no scan job execution request is received from the data processing apparatus 101, the processing proceeds to step S1405. In step S1405, the job control unit 507 obtains a list of bibliographic information associated with the information about the login user notified by the authentication unit 503. In step S1406, the job control unit 507 determines a print job or jobs to be automatically printed from the obtained list of bibliographic information. In the present exemplary embodiment, a print job to be automatically printed refers to one where the password 1308 is no and the printing state 1309 is print standby in the bibliographic information table 1301. However, this is not restrictive. In step S1407, if the job control unit 507 determines that there is no print job to be automatically printed (NO in step S1407), the processing ends. If the job control unit 507 determines that there is a print job to be automatically printed (YES in step S1407), the processing proceeds to step S1408. In step S1408, the print processing unit 513 performs print processing based on instructions from the job control unit 507. The processing ends.

In such a manner, the post-local-authentication automatic print processing is performed. After the scan processing is performed by the image forming apparatus 104 based on the job execution request in step S808, the UI control unit 402 of the data processing apparatus 101 may provide a display for notifying that a print job or jobs associated with the user is/are stored in the HDD 305 of the image forming apparatus 104. The UI control unit 402 may further provide a display for accepting a user instruction to execute the print job(s) associated with the user. If an execution instruction for the print job(s) is accepted after the execution of the scan processing based on the job execution request, the UI control unit 502 performs the print processing. This enables the user to check the presence of a print job or jobs on standby and then give instructions to execute the print job(s) after the execution of the scan processing based on the job execution request.

The present exemplary embodiment has dealt with a method where the image forming apparatus 104 controls the processing supposed to be automatically executed based on a local authentication not to be executed based on the operation control information included in a job execution request for a scan from the data processing apparatus 101.

Instead of the operation control information, the data processing apparatus 101 may include an identifier of the own apparatus into the job execution request. The image forming apparatus 104 may control the processing supposed to be automatically executed based on a local authentication not to be executed based on the inclusion of the identifier of the data processing apparatus 101.

In FIG. 7, the data processing apparatus 101 is described to transmit a scan job execution request to the image forming apparatus 104. However, the job content is not limited to a scan. For example, the job execution request may relate to other processing such as printing and FAX transmission.

According to the present exemplary embodiment, a print job different from a job instructed by the user from the image processing terminal can be prevented from being executed based on user authentication performed to execute the instructed job.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-026674, filed Feb. 22, 2021, which is hereby incorporated by reference herein in its entirety.

What is claimed is:

1. An image forming apparatus configured to include an execution function of performing first authentication processing using user information input through a user operation performed by a user on the image forming apparatus and executing a stored job, which is stored in a storage device in association with the user based on a success of the first authentication processing without an instruction from the user, the image forming apparatus comprising:
   one or more memories; and
   one or more processors that execute a set of instructions to:
      receive a job execution request to execute a job different from the stored job from an information processing terminal, the job execution request including the user information;
      perform second authentication processing using the user information received from the information processing terminal; and
      based on a success of the second authentication processing, control execution of the execution function of executing the stored job without the instruction from the user to prevent the execution function from being executed.

2. The image forming apparatus according to claim 1, wherein the one or more processors further execute the set of instructions to determine whether to control the execution of the execution function to prevent the execution function from being executed.

3. The image forming apparatus according to claim 2,
   wherein the one or more processors further execute the set of instructions to receive a job execution request to execute a job different from the stored job from the information processing terminal,
   wherein the job execution request includes control information for restricting execution of another job than the job related to the job execution request, and
   wherein in a case where the job execution request includes the control information for restricting the execution of another job than the job related to the job execution request, the execution of the execution function is determined to be controlled to prevent the execution function from being executed, and in a case where the job execution request does not include the control information, the execution of the execution function is determined not to be controlled to prevent the execution function from being executed.

4. The image forming apparatus according to claim 2,
   wherein the one or more processors further execute the set of instructions to receive a job execution request to execute a job different from the stored job from the information processing terminal, and
   wherein in a case where the job execution request includes identification information about the information processing terminal from which the job execution request is transmitted, the execution of the execution function is determined to be controlled to prevent the execution function from being executed, and in a case where the job execution request does not include the identification information about the information processing terminal, the execution of the execution function is determined not to be controlled to prevent the execution function from being executed.

5. The image forming apparatus according to claim 1, wherein the one or more processors further execute the set of instructions to:
   receive a job execution request to execute a job different from the stored job from the information processing terminal; and
   in the case where the job execution request is received and the second authentication processing is successful, execute the job related to the job execution request.

6. The image forming apparatus according to claim 5, wherein in a case where the stored job is a stored print job and an execution instruction for the stored print job is accepted from the information processing terminal after the job related to the job execution request is executed, the stored print job is executed.

7. The image forming apparatus according to claim 1, wherein the one or more processors further execute the set of instructions to:
   perform third authentication processing for starting communication with the information processing terminal, the third authentication processing being performed before the second authentication processing; and
   receive a job execution request to execute a job different from the stored job from the information processing terminal with which the third authentication processing is successful.

8. A control method for an image forming apparatus that includes an execution function of performing first authentication processing using user information input through a user operation performed by a user on the image forming apparatus and executing a stored job, which is stored in a storage device in association with the user based on a success of the first authentication processing without an instruction from the user, the control method comprising:

receiving a job execution request to execute a job different from the stored job from an information processing terminal, the job execution request including the user information;

performing second authentication processing using the user information received from the information processing terminal; and based on a success of the second authentication processing, controlling execution of the execution function of executing the stored job without the instruction from the user to prevent the execution function from being executed.

9. A non-transitory computer readable storage medium on which is stored a computer program for making a computer execute a control method for an image forming apparatus that includes an execution function of performing first authentication processing using user information input through a user operation performed by a user on the image forming apparatus and executing a stored job, which is stored in a storage device in association with the user based on a success of the first authentication processing without an instruction from the user, the control method comprising:

receiving a job execution request to execute a job different from the stored job from an information processing terminal, the job execution request including the user information;

performing second authentication processing using the user information received from the information processing terminal; and based on a success the second authentication processing, controlling execution of the execution function of executing the stored job without the instruction from the user to prevent the execution function from being executed.

\* \* \* \* \*